Jan. 6, 1931.     D. GERBER     1,787,899
ICE CREAM CONE
Filed Jan. 7, 1926
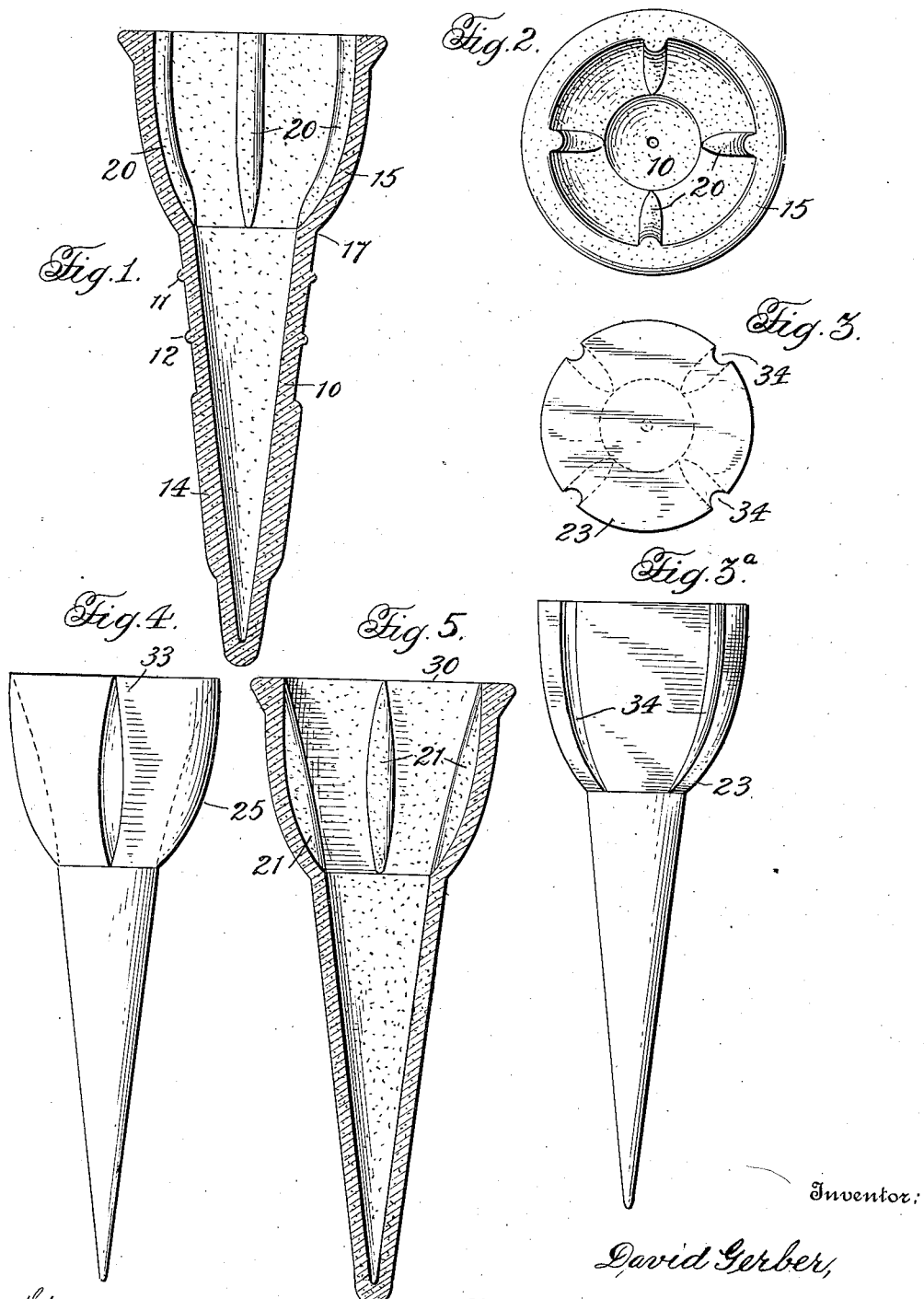

Patented Jan. 6, 1931

1,787,899

UNITED STATES PATENT OFFICE

DAVID GERBER, OF BALTIMORE, MARYLAND, ASSIGNOR TO JOSEPH SHAPIRO, OF BALTIMORE, MARYLAND

ICE-CREAM CONE

Application filed January 7, 1926. Serial No. 79,871.

This invention relates to ice cream cones and has for its object the improvement of ice cream cones with a view to preventing loss of the sphere of ice cream usually contained in the cone while at the same time strengthening quite materially the cup itself.

In the straight conical ice cream cone there is a little danger of breaking the cone at any particular place when jamming down into it the sphere of ice cream which it is made to receive but in the much more beautiful shapes particularly those marketed under the trademark "Torch Cup", there is a decided line of minimum strength, this being at the junction of the bowl and the rather slender conical handle. It has also been noted in practice that there is perhaps a slightly greater danger of loss of the ball of ice cream from these more beautiful shapes than from the plain conical cup and an object of the present invention is to correct simultaneously both of these faults of the large bowl and slender handle ice cream cones.

In the drawings:

Figure 1 is a central section thru a cone embodying the present invention.

Figure 2 is a view looking down into the cone.

Figures 3 and 3a are views of a core for producing the cone of the present invention.

Figure 4 is a modified and preferred form of core.

Figure 5 is a modified form of cone.

In Figure 1 the outside shape of the cone is of well known, old, and at present very popular type of cone in which the handle 10 is quite slender, usually truly conical but frequently having ornamental rings such as 11 and 12 and sometimes slight figures such as the vertical ribs shown at 14. The bowl 15 is roughly semi-spherical and is of such size as to receive snugly the usual helping of ice cream. It has been found that there is a point of weakness at 17, the junction between the bowl and the handle and it is not practical to thicken the cone here if it is necessary to have the heat conveyed to the cake thru the mold (not thru the core).

The ribs 20 may be two, three, four, or five in number since these ribs are entirely on the inside and are formed on the core which is a solid piece, absolutely irrespective of the formation of the mold which is almost invariably made in two half sections. I prefer however, to have the ribs four in number as shown. These ribs may either be as shown at 20 in Figure 1, as produced by the core 23 shown in Figure 3 or they may be quite a bit smaller as in the preferred form 21, shown in Figure 5 which is produced from the core 25 in Figure 4.

In the preferred form the rib 21 is thickest at the center and tapers almost to a point at the rim 30 and also at the junction between the bowl and handle cavities. In the other modification the rib 20 is uniform in cross section from about its center upward to the rim, and in a plane containing the rim the rib is seen as an isosceles triangle. One reason I prefer the modification shown in Figure 5 is that the cone may be more easily filled with ice cream; this feature is especially noticeable where the cream is very hard. There is less breakage in the cone of Figure 5.

In order to form the ribs of my invention on any existing torch cup baking machine it is merely necessary to take the ordinary cores and to groove them as shown in Figure 3 or as shown in Figure 4. In the latter figure the grooves 33 are double concave while the grooves 34 in the core 23 would appear to have parallel lines near the top if viewed radially instead of at the slight angle, as shown in Figure 3 for simplicity of illustration. Naturally no change of any kind need be made in the mold sections.

A very important feature is that the heat necessary to bake the extra ribs is provided not by the molds but by the cores themselves which in the ordinary operation of ice cream baking machines are heated at some stage of the operation and usually during the entire time they are in the baking oven; hence while in accordance with this invention I add slightly more batter, I do not require any change in time of baking nor apparently do I require any greater consumption of gas or other fuel, and I achieve the great advantage of being able to eliminate two objections by the same means. While the great feature is as just stated I wish it understood that the provision of any sort of means projecting from the inner surface of the cone to hold in place the helping of ice cream is within my invention as is also any grooving of the core whereby the excess batter is heated from the core and not from the mold.

What I claim is:—

An ice cream cone having a stem and a bowl of such size and shape as to receive snugly the usual spherical helping of ice cream, the bowl characterized by the provision of internal ribs lying in planes parallel to the cone axis, each of said ribs being non-uniform in cross section gradually varying in cross sectional area from a maximum at about its middle upward to a minimum at the rim of the bowl and varying in the same way downwardly to a like minimum at the junction of the stem and bowl adapted to engage a sphere of ice cream contained in the bowl so as to prevent rotation of the ice cream in the bowl, the inward edge of said ribs lying approximately in the upwardly projected surface of the stem.

In testimony whereof I affix my signature.

DAVID GERBER.